United States Patent
Peters et al.

(10) Patent No.: US 6,481,214 B2
(45) Date of Patent: Nov. 19, 2002

(54) THROW-AWAY CONTAINER FOR HEATING AND COOLING OF LIQUIDS

(76) Inventors: Sascha Peters, Königstrasse 70, 52072 Aachen (DE); Udo Schneider, Roermander Strasse 542, 52072 Aachen (DE); Vanessa Dressen, Hasslerstrasse 10, 52066 Aachen (DE); Fabian Seibert, Steppenbergallee 137, 52074 Aachen (DE)

( * ) Notice: Subject to any disclaimer, the term of this patent is extended or adjusted under 35 U.S.C. 154(b) by 0 days.

(21) Appl. No.: 09/771,182

(22) Filed: Jan. 26, 2001

(65) Prior Publication Data

US 2001/0029741 A1 Oct. 18, 2001

(51) Int. Cl.⁷ .................... F25D 5/00; B65B 63/08; F24J 1/00; F24J 3/00
(52) U.S. Cl. ................. 62/4; 62/60; 126/263.09
(58) Field of Search ................. 62/4, 60, 371; 126/263.01, 263.08, 263.09

(56) References Cited

U.S. PATENT DOCUMENTS

| | | | | |
|---|---|---|---|---|
| 2,914,062 A | * | 11/1959 | Del Raso | 126/263.09 |
| 3,338,067 A | * | 8/1967 | Warner | 62/371 |
| 3,802,056 A | * | 4/1974 | Jaeger | 29/422 |
| 3,970,068 A | * | 7/1976 | Sato | 126/263.08 |
| 4,773,389 A | * | 9/1988 | Hamasaki | 126/263.08 |
| 5,628,304 A | * | 5/1997 | Freiman | 126/263.09 |
| 5,979,164 A | * | 11/1999 | Scudder et al. | 62/4 |
| 6,123,065 A | * | 9/2000 | Teglbjarg | 126/263.09 |

FOREIGN PATENT DOCUMENTS

FR   2666311 A1  * 10/1992

* cited by examiner

*Primary Examiner*—William C. Doerrler

(57) ABSTRACT

Suggested is a throw-away container (1) for self-heating or self-cooling of liquids or solid matters, consisting of two spaces (16, 17) separated by an internal foil (7), a metal vessel (4) and a tear-off foil (5), said metal vessel (4) being wedged, glued or sealed to an upper component (3), which is via a thread (8) rotatably arranged in relation to a lower component (2) and the foil (7) is destructible by this rotational motion.

10 Claims, 3 Drawing Sheets

THROW-AWAY CONTAINER FOR HEATING AND COOLING OF LIQUIDS

The invention relates to a throw-away container for self-heating or self-cooling of liquids or solid matters consisting of two by an internal foil separated spaces filled with reagents, which, when brought into contact, initiate an exothermic or endothermic reaction, a metal vessel and a tear-off foil, said metal vessel being wedged, glued or sealed to an upper component.

In the prior art throw-away containers for self-heating of liquids or solid matters are known. Thus, for example in EPB 0 255 494 a self-heating throw-away container for liquids and solid matters is described consisting of an outer insulating coat, a case arranged inside this insulating coat, with the case being subdivided into two sections separated by a membrane thus forming an upper section and a lower section; a vessel for liquid or solid matters; which is connected with said case and which is closed at its upper end by a diaphragm to be torn off, and which is provided with a break-through link arranged inside the lower section of said case, said break-through link being able to break through the diaphragm due to an outer force with said case consisting of a synthetic material and being completely fixed to the coat, the vessel being a metal vessel, which is arranged inside the synthetic case and fixed at the upper part of said synthetic case by wedging or by shrink-connecting and welded to the diaphragm, a cover element at the upper part of said vessel for sealing and protecting said self-heating vessel and said case containing a liquid reagent in the lower section and a solid reagent in the upper section, or vice versa.

This complex structure makes the vessel as described in EPB 0 255 494 not very appropriate as a throw-away article for goods of low value.

However, there is a demand for throw-away containers for self-heating as to, for example, drinks, such as an espresso, during travels. These throw-away containers are designed for interested persons, who look for fast and not complicated food consumption while travelling.

Therefore, the task of the present invention was to provide a throw-away container for self-heating or self-cooling of liquids or solid matters, the structure of which is simpler than the one known in the prior art.

The task is solved by providing a throw-away container for self-heating or self-cooling of liquids or solid matters consisting of two by an internal foil separated spaces filled with reagents, which, when brought into contact, initiate an exothermic or endothermic reaction, a metal vessel and a tear-off foil, said metal vessel being wedged, glued or sealed to an upper component, with said container being characterized in that the upper component is via a thread arranged rotatably in relation to a lower component and that the foil is destructible by this rotational motion.

Via a simple rotational motion, the foil is cut through inside the container, so that through the reaction of the reagents contained in the two spaces, the espresso for example is heated and can be drunk after removing the protection cover.

In a preferred embodiment the lower component below the foil shows one or more cutting edges for cutting through the foil. Especially preferred in this connection are four cutting edges arranged on the thread.

Moreover, a throw-away container is preferred, in which the rotational motion is limited by a locking device. The lower component can be rotated via a thread by half a rotation in relation to the upper component. A locking device prevents both an unintended, too far a turning-in before use and an uncontrolled turning-out after use of the lower component.

Hereby, the thread does not take over any sealing effect. It consists of two twine threads, which are arranged along a circular path with adequate lead at the lower component. The sealing effect after turning around is created by a wedge effect, with the upper component wedging into the lower one.

In an especially preferred embodiment the throw-away container is characterized in that the upper component above the thread is additionally provided with one or more sealing lips. They prevent the air exchange between the environment and the possibly moisture-sensitive reagent.

In a further special embodiment of the throw-away container, the gap between the upper component and the lower component is covered by a strap. The strap is used to prevent from unintended turning around before use. It can additionally be coated all over by a gluing plastic foil, in order to protect the solid reagent from incoming moisture. This foil can additionally be employed for printing on advertising or instructions for use.

The throw-away container can show vertical ribs at its lower component. These serve for stiffening.

The upper space can be filled with water, the lower space with calcium oxide, water-free calcium chloride, magnesium oxide, ammonium nitrate, ammonium chloride or sodium nitrate. In this connection the arrangement of the reagents in the spaces can be the vice versa. The reaction of water with calcium chloride, calcium oxide or magnesium oxide leads to an exothermic reaction, the reaction of ammonium nitrate, ammonium chloride and sodium nitrate to an endothermic reaction. Calcium chloride is especially moisture-sensitive. The heat created by the exothermic reaction is used for heating, the cold produced by the endothermic reaction is used for cooling the liquid or the solid matter in the metal vessel.

The upper and the lower component consist of polypropylene, such as homopolypropylene, the metal vessel of a deep-drawn aluminium sheet, which is coated on both sides with polypropylene. This coating on the upper side of the vessel is necessary in order to make it appropriate for food stuff. The coating on the lower side is necessary, as the deep-drawn metal vessel can be connected to the upper synthetic component by applying a sealing process. The internal foil is an aluminium foil which is also coated with polypropylene.

At the upper end of the upper component there is an aluminium foil, which can be torn off and which is coated with synthetic material, said aluminium foil protecting the liquid or the solid matter before consumption from contamination or decaying. The lower synthetic container does not only serve for storing the reagent but also for insulating against the heat being produced inside.

For being able to simply assemble the metal vessel at the upper component a locking device is provided at it.

The invention will now be described according to the drawing.

Figure 1:
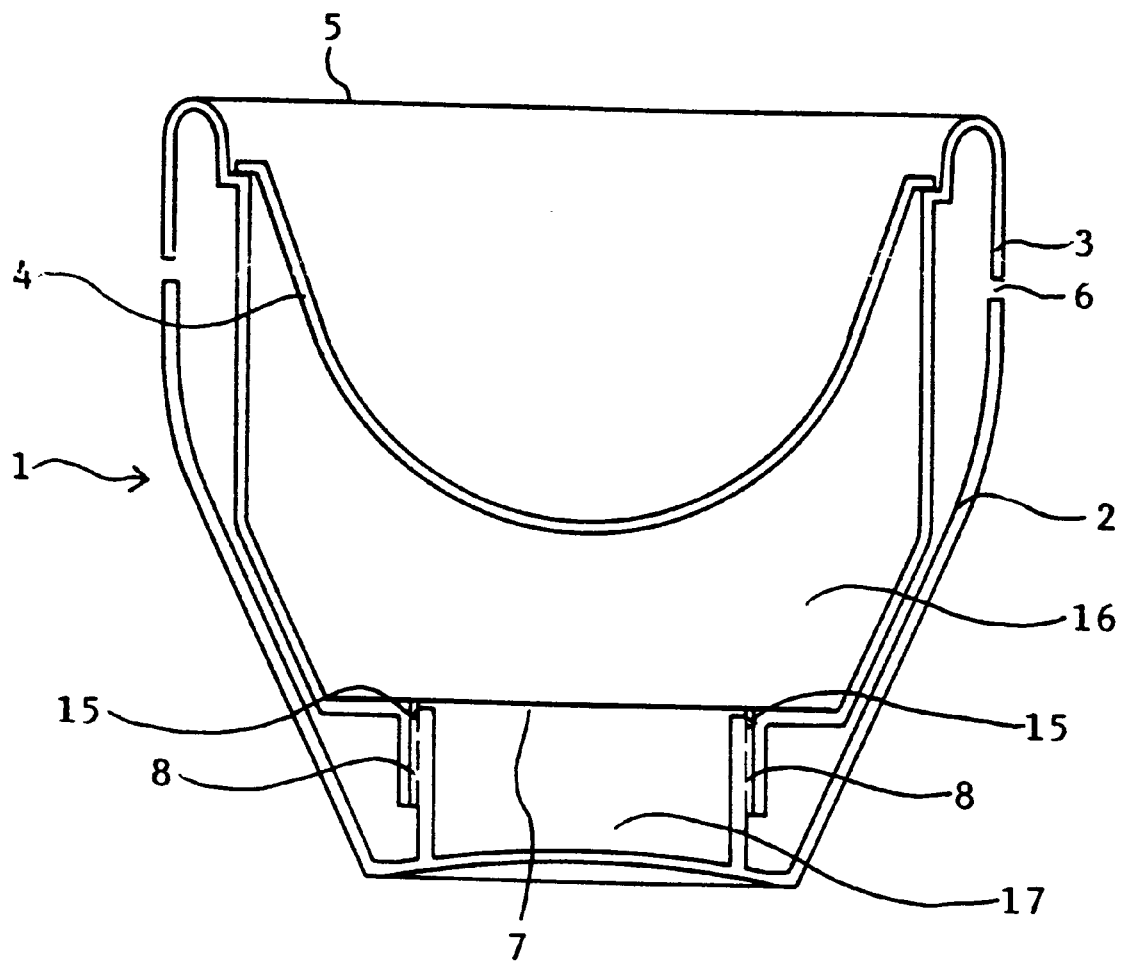
FIG. 1 shows the view of the container according to the invention.

FIG. 1 schematically shows the basic structure of the container 1 consisting of a lower component 2 and an upper component 3, which are connected via a thread 8. In the upper component 3 the metal vessel 4 is contained. The internal foil 7 produces an upper space 16 and a lower space 17 for taking the reagents in. The upper component 3 is covered by a foil 5, which can be torn off. Between the upper component 3 and the lower component 2 there is the gap 6, which can be encompassed by a strap as freshness seal. In a preferred embodiment there is a ring-shaped sealing lip 15 above the thread 8.

Figure 2:
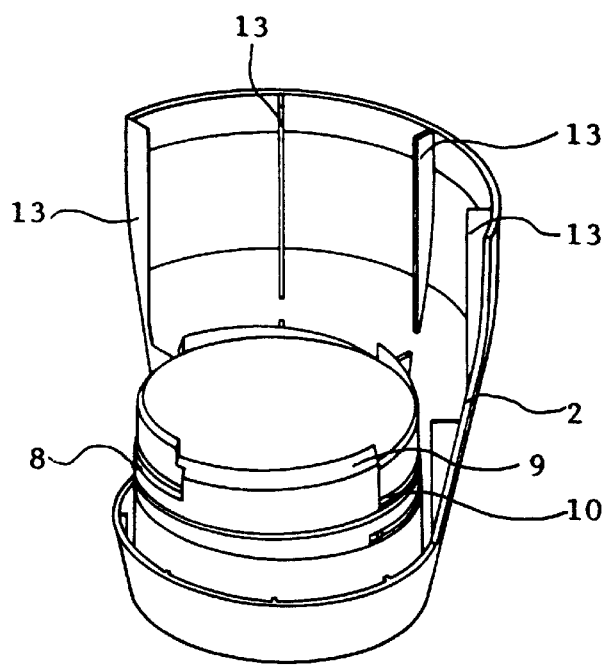
FIG. 2 shows the view and inclined top view of the lower component of the container.

FIG. 2 shows several ribs 13 for stiffening the lower component 2. Moreover, FIG. 2 shows the circularly arranged twine thread 10 of the thread 8 as well as four cutting edges 9 for cutting through the internal foil 7.

Figure 3:
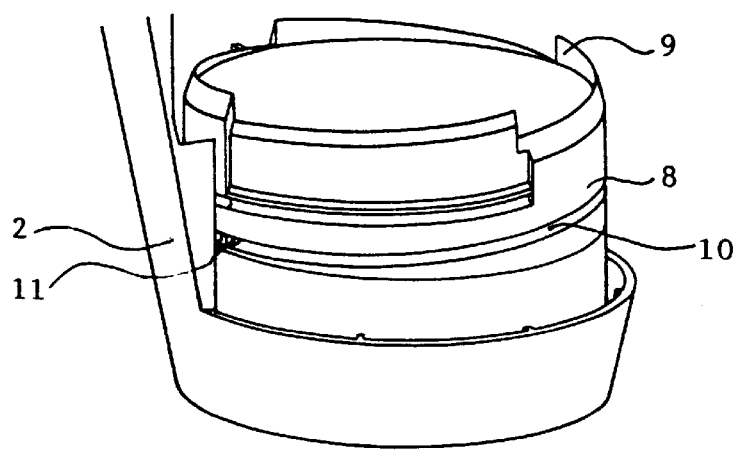
FIG. 3 shows the side view of the lower part of the lower component of the container.

In addition, FIG. 3 shows the deepening 11, which serves for locking into place a counter-part, thus limiting the rotational motion of both components (2, 3) against one another.

Figure 4:
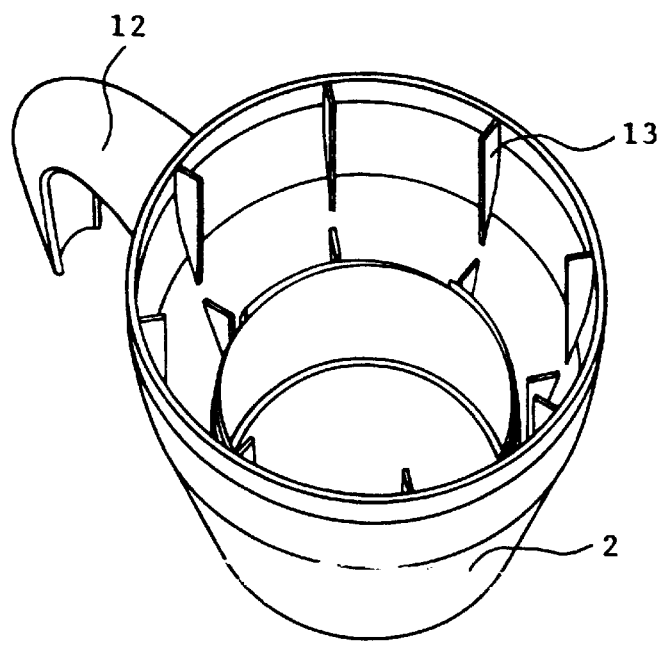
FIG. 4 shows the inclined top view of the lower component of the container.

FIG. 4 shows the stiffening of the lower component by the ribs 13. At the lower component as well, there can be a handle 12. By this it is easier to, for example, drink the espresso and at the same time it insulates against the hot areas of the container 1.

Figure 5:
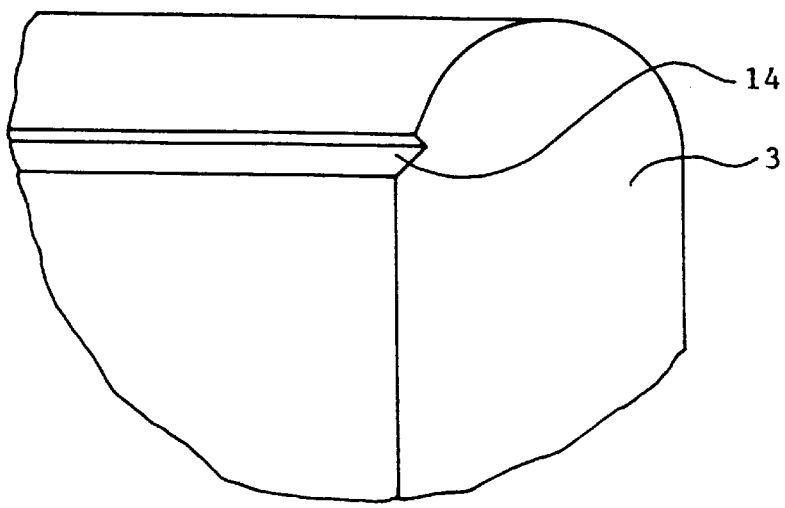
FIG. 5 shows the side view of a sector of the upper part of the upper component.

FIG. 5 shows the upper component 3 with the recession 14, into which the metal vessel 4 can easily be locked. By this locking the metal vessel 4 is held during the sealing process. After the sealing the metal vessel 4 gets stuck in the upper component 3, even if there is a possible pressure increase in the space 16 below.

List of Reference Numbers
1 container
2 lower component
3 upper component
4 metal vessel
5 tear-off foil
6 gap
7 internal foil
8 thread
9 cutting edge
10 twine thread
11 deepening
12 handle
13 rib
14 recession
15 sealing lip
16 upper space
17 lower space

What is claimed is:

1. Throw-away container for self-heating or self-cooling of liquids or solid matters consisting of two internal spaces separated by a foil (7) filled with reagents, which, when brought into contact, initiate an exothermic or endothermic reaction, a metal vessel disposed on top of said internal spaces, and a tear-off foil, said metal vessel being edged, glued or sealed to an upper component (3) characterized in that said upper component (3) is via thread (8) arranged rotatably in relation to a lower component (2), said foil (7) being destructible by said rotational motion and that said lower component (2) below said foil (7) has one or more cutting edges (9) and a locking device for limiting said rotational motion.

2. Throw-away container according to claim 1, characterized in that the upper component (3) above the thread (8) shows one or more sealing lips (15).

3. Throw-away container as in claim 1 comprising a gap (6) between the upper component (3) and the lower component (2) wherein said gap (6) is covered by a strap.

4. Throw-away container as in claim 2 comprising a gap (6) between the upper component (3) and the lower component (2) wherein said gap (6) is covered by a strap.

5. Throw-away container as in claim 1 wherein said lower component (2) comprises vertical ribs.

6. Throw-away container as in claim 2 wherein said lower component (2) comprises vertical ribs.

7. Throw-away container as in claim 3 wherein said lower component (2) comprises vertical ribs.

8. Throw-away container as in claim 1 wherein said lower component (2) comprises vertical ribs.

9. Throw-away container as in claim 2 wherein said lower component (2) comprises vertical ribs.

10. Throw-away container as in claim 3 wherein said lower component (2) comprises vertical ribs.

* * * * *